UNITED STATES PATENT OFFICE.

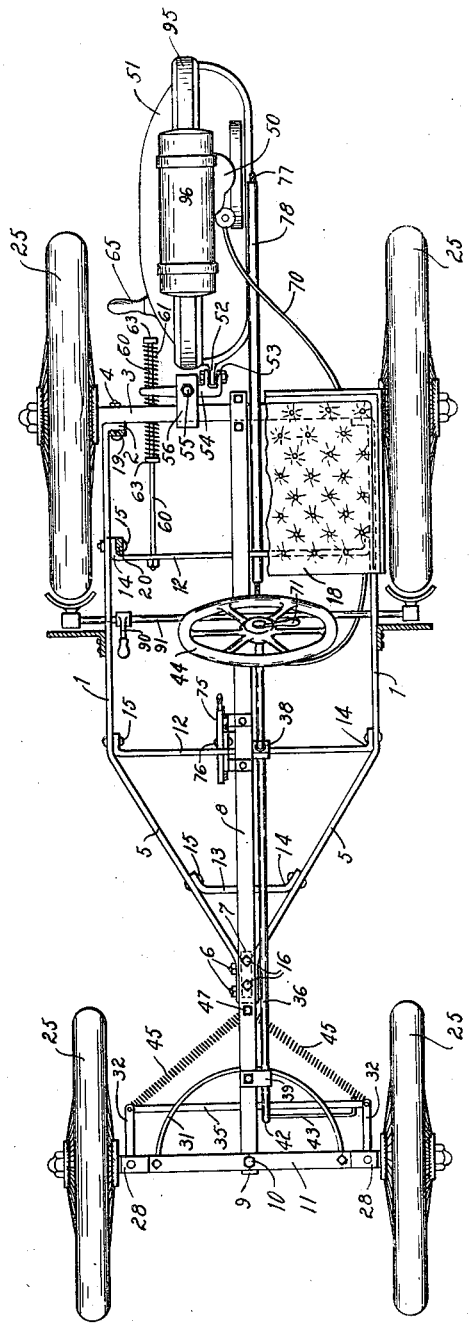

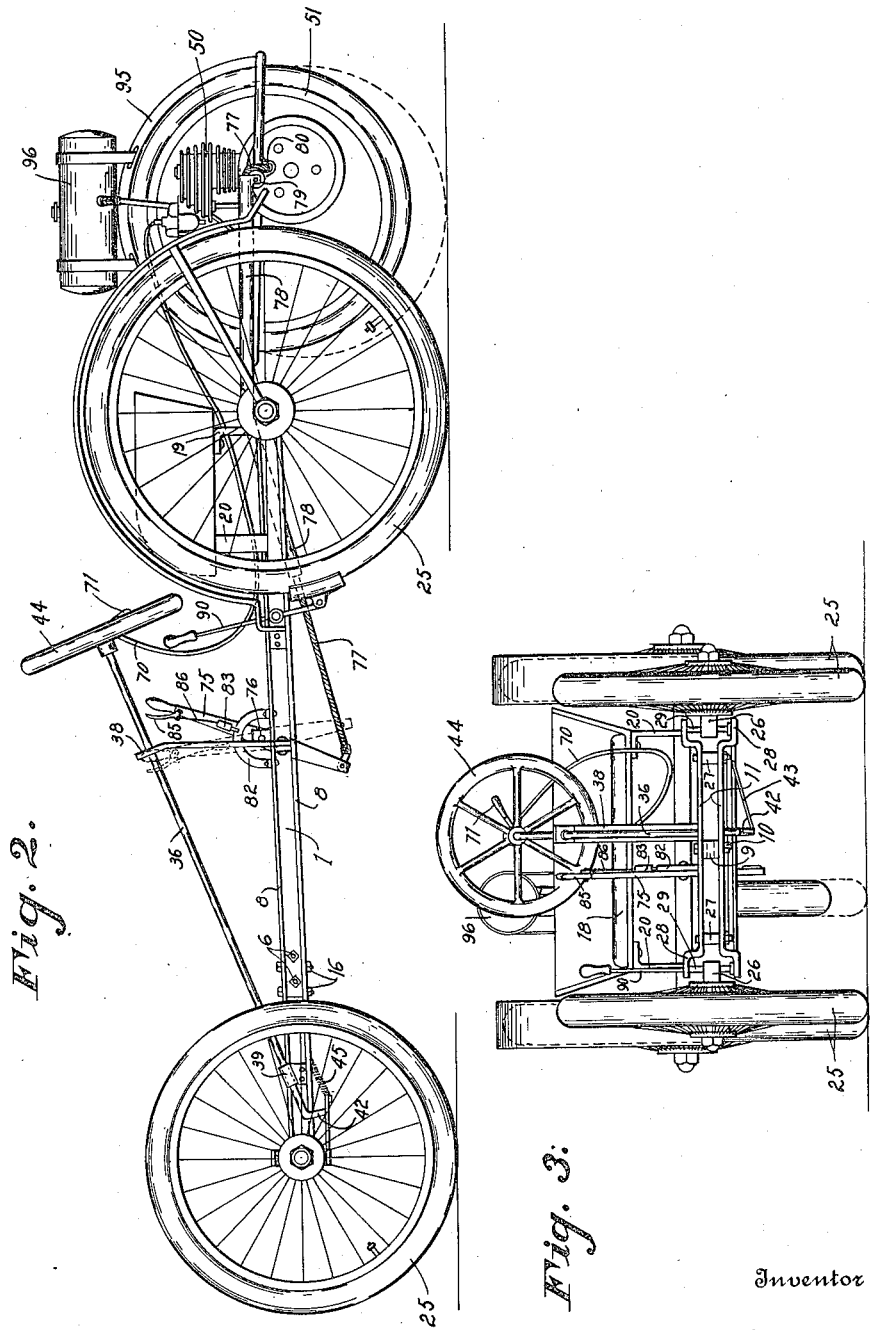

HERMAN J. STARR, OF OSAGE, IOWA, ASSIGNOR TO A. O. SMITH CORPORATION, OF MILWAUKEE, WISCONSIN, A CORPORATION OF NEW YORK.

MOTOR-DRIVEN VEHICLE.

1,297,747. Specification of Letters Patent. Patented Mar. 18, 1919.

Application filed December 7, 1916. Serial No. 135,520.

*To all whom it may concern:*

Be it known that I, HERMAN J. STARR, a citizen of the United States, residing at Osage, county of Mitchell, and State of Iowa, have invented new and useful Improvements in Motor-Driven Vehicles, of which the following is a specification.

My invention relates to improvements in motor driven vehicles.

The object of my invention is to provide a simple and inexpensive structure particularly suited to the requirements of toy wagons and similar vehicles, designed to be used by small children. More specifically stated, my object is to provide a vehicle for children to play with, which will be light, strong, and durable, but which will have adequate steering mechanism possessing the general characteristics of the steering mechanism of a motor driven vehicle, and capable of efficient use when the vehicle is being driven by a small motor. But in order to avoid weight, and the danger which would otherwise result if a motor were mounted upon such a vehicle, it is a part of my object to provide means for detachably connecting to the vehicle proper, a single traction wheel, preferably as a pushing attachment, the traction wheel carrying the motor and the arrangement being such that instead of stopping or starting the motor or disengaging its power transmitting mechanism from the traction wheel, the motor may be allowed to continue in operation with the traction wheel in rotation, but with the vehicle at rest, or running free, by merely lifting the traction wheel from the surface of the ground, thereby temporarily rendering its driving power ineffective.

In the drawings—

Figure 1 is a plan view of a motor driven vehicle embodying my invention.

Fig. 2 is a side elevation of the same.

Fig. 3 is a front elevation.

Like parts are identified by the same reference characters throughout the several views.

The frame.

The main frame of my improved vehicle comprises a set of side bars 1 having elbowed rear extremities 2, each connected with the rear axle 3 by a bolt 4. The front portions 5 of these bars converge and are connected with each other by a connecting block 7 between the upper and lower members 8 of the reach and to which the portions 5 of the bars 1 are connected at their front extremities by bolts 6. These frame bars and also the reach, may be formed of flat bars of strap iron or steel. The reach is preferably formed by folding the middle portion of such a bar upon itself in a U shaped bend 9, which is assembled with the two legs or members 9 spaced apart in a vertical plane. A king bolt 10 connects the reach with the front axle 11. Cross braces 12 and 13 of similar material connect intermediate portions of the frame bars 1 with each other, the ends of these braces being elbowed at 14 and bolted to the bars 1 at 15. These cross braces are assembled with their flat or wider surfaces in vertical planes and they extend between, and serve as spacers for, the members 8. The connecting block 7 also serves as a spacer for the reach members 8 and may be connected therewith by a vertical bolt 16. The horizontal bolts 6 connect the frame bars 1 with this block 7. A seat 18 may be supported from the main frame and also from the reach by supporting posts 19 and 20, which may be formed of similar material. I have not illustrated a body for the reason that this would tend to add weight and conceal the mechanism, and I prefer to have the mechanism in full view for educational purposes, and also for the reason that any tendency of the parts to break or bend may be more readily noted and repairs made before serious damage results.

The axles 3 and 11 may be formed of any suitable material and the wheels 25 may be of ordinary construction. But the front axle 11 is preferably formed of two pieces of strap iron separated by spacer blocks 27 and having at each end swinging stub axle members 26. The outer ends of the bars forming the axle 11 are spread in a vertical plane to form fork arms 28 which are connected by vertical steering posts 29 with the inner ends of the stub axle extensions 26. A circle bar 31 extends between the members 8 of the reach.

The steering mechanism.

Steering arms 32 are connected with the respective stub axle members 26 and connected with each other by a cross link 35. An inclined steering head rod 36 is journaled in a post 38 mounted upon one of the cross bars 12 and also in a bearing clip 39 bolted to one side of the reach. The lower end of the head rod 36 is elbowed at 42 and pivotally connected by a link 43 with the cross link 35, whereby a steering motion may be transmitted to both arms 32 and to the respective stub axles and front wheels. The upper end of the rod 36 is provided with a manually operable steering wheel 44. Coiled tension springs 45 preferably connect the rear ends of the arms 32 with the reach bolt 47. These springs tend to hold the arms 32 parallel with the reach and therefore facilitate the effort of the rider to keep the vehicle in a straight course.

The driving mechanism.

A motor 50, preferably of the internal combustion type, is mounted upon one side of an auxiliary or traction wheel 51, the motor being operatively connected to drive the wheel. The motor frame has an arm 52 pivotally connected at 53 to a lever 54. Lever 54 is fulcrumed at 55 to a bracket 56 which is clamped to the rear axle 3 and beyond the bracket 56 the lever is forked to receive a guide rod 60. Springs 61, coiled about the guide rod 60 are interposed between the forked arm of the lever and front and rear collars or nuts 63 on the rod 60, whereby swinging movements of lever 54 upon its vertical fulcrum pin 55 are resiliently opposed and the lever normally held in a position parallel to the rear axle, i. e., with the traction wheel 51 in a plane parallel with those of the rear wheels of the wagon. The horizontal pivot pin 53 permits independent vertical movements of the traction wheel, whereby it is free to conform to the contour of the roadway and whereby it merely pushes the wagon without supporting it or adding to its weight. The motor wheel is provided with a crank handle 65 whereby the motor may be started by raising the wheel from the ground and rotating it manually by means of this crank 65. The motor may therefore have its driving shaft permanently geared to the wheel axle, in any suitable manner. I do not claim the structure of either the motor or wheel, as such auxiliary motor carrying traction wheels are in general use for pushing bicycles, and therefore detailed description of the motor mechanism and associated parts relating to the auxiliary tractor is deemed unnecessary.

The controlling mechanism.

A controlling wire of ordinary type, incased in a flexible tube 70 extends from the motor to the hand wheel, the wire being connected with a controlling lever 71 mounted on the steering wheel 44. It is not material to my invention whether this lever 71 is used to operate a throttle valve or to control the ignition of combustible gas in the motor. Both methods of control are well known and do not require detailed description. But in order that the vehicle may be permitted to slow down or stop without stopping the motor or checking its speed, I employ means for lifting the traction wheel from the ground. The horizontal pivot bolt 53 allows the traction wheel to be swung upwardly and this may be accomplished from the driver's seat by means of lever 75 pivoted to the frame at 76 and connected with the motor frame by a cable or other flexible connection 77. The cable is preferably passed through a guide tube 78 and over a pulley 79 at the rear end thereof and connected with the motor frame at 80. A toothed segment 82 is mounted on the frame and a spring actuated locking key 83 carried by the lever 75 is adapted to engage between the teeth of the segment to hold the device in any desired position of adjustment subject to release by means of a thumb lever 85 linked to the key by a rod or wire 86.

A brake lever 90 is secured to a rock shaft 91, journaled in the frame and provided with an arm 92 carrying a brake shoe 93. If desired brake shoes may be provided at each end of the rod or shaft 91, whereby both rear wheels may be engaged.

By constructing the frame from pieces of strap iron as above described, and by forming the steering head from a single rod, elbowed at one end to form a motion transmitting arm and provided with a hand wheel, or equivalent actuating connection at the other, and by relieving the vehicle proper from the weight of the motor and other driving mechanism and also by providing means for raising the traction wheel and allowing the motor to run free whereby clutches and variable speed mechanisms are dispensed with, I am able to provide an extremely light, inexpensive and safe vehicle. Owing to its light weight the vehicle has little inertia and in case of collision with other objects, either moving or stationary, there is substantially no more danger to the occupants of such vehicles than there is to the occupant of a sled under similar circumstances. The distance of the motor from the occupant and the fact that it is in the rear of the vehicle make it unlikely that the occupants will be burned or otherwise injured either when playing about a standing vehicle, or following an accident. And while running, the gases of combustion, and any grease that may be thrown off by the traction wheel or fly wheel are unlikely to reach the occupants. Mud guards or shields may be employed, such as the guard 95 and this may serve as a support for a fuel tank 96.

I claim—

1. A motor driven and motor carrying traction wheel provided with a manually operable crank on one side of the wheel, means for supporting the wheel above the roadway when the crank is in use, a motor supporting frame and motor on the other side of the wheel, and a connecting arm in front of the wheel and a coupling at the front end of said arm adapted to connect the same with a vehicle in pushing relation thereto, said coupling being provided with means for allowing said wheel to swing freely in a vertical plane and to normally hold the wheel in a position to exert direct forward pressure.

2. A motor driven and motor carrying traction wheel provided with a manually operable crank on one side of the wheel, means for supporting the wheel above the roadway when the crank is in use, a motor supporting frame and motor on the other side of the wheel, and a connecting arm in front of the wheel adapted to be pivotally connected with a vehicle to propel the same, said motor being in permanent driving connection with the wheel.

3. The combination with a vehicle, of a motor driven, motor carrying, traction wheel provided with a projecting crank on one side and a motor on the other side in permanent driving relation with the wheel, said motor having its frame arranged to support the wheel and provided with a forwardly projecting arm coupled to the vehicle and adapted to swing in a vertical plane, and means for supporting said arm in a raised position with the traction wheel out of contact with the ground and in a position beyond the body of the vehicle to facilitate motor starting operations of said crank.

4. A motor driven and motor carrying traction wheel adapted to be used as an actuator for other vehicles, provided with a manually operable crank on one side of said wheel, and means for supporting the traction wheel from the driven vehicle out of contact with the ground when the crank is being operated.

5. The combination with a vehicle, of an auxiliary motor carrying traction wheel operatively connected to actuate the vehicle and adapted as a motor starting means, and means connected with the vehicle for lifting the traction wheel above the ground for the starting operation.

6. The combination with a vehicle, of an auxiliary motor carrying traction wheel operatively connected to actuate the vehicle, a motor carried by the wheel in permanent driving connection therewith, and means connected with the vehicle for lifting the traction wheel above the ground, said traction wheel having a handle connected therewith whereby it may be rotated manually to start the motor.

7. The combination with a vehicle, of an auxiliary motor carrying traction wheel operatively connected to actuate the vehicle, means connected with the vehicle for lifting the traction wheel above the ground adapted as a motor starting means, and means for locking the traction wheel in the raised position.

8. The combination with the rear axle of a vehicle, of a lever pivotally supported therefrom and adapted to swing substantially in a horizontal plane, a motor carrying traction wheel having a connecting member pivoted to said lever and adapted to swing in a substantially vertical plane, and means for resiliently opposing said swinging horizontal movements.

9. The combination with a vehicle having a main frame, a rear axle and a pair of supporting wheels thereon, of a motor carrying traction wheel, a motor supporting frame carried thereby and flexibly connected with the rear axle between said rear wheels; said motor and traction wheel being adapted to drive the vehicle through the medium of said connection, a lever pivoted to the main frame and a flexible connection between the lever and the motor carrying traction wheel, adapted, when the lever is swung in one direction, to lift the wheel from the ground.

10. The combination with a vehicle having a main frame, a rear axle and a pair of supporting wheels thereon, of a motor carrying traction wheel, a motor supporting frame carried thereby and flexibly connected with the rear axle between said rear wheels; said motor and traction wheel being adapted to drive the vehicle through the medium of said connection, a lever pivoted to the main frame and a flexible connection between the lever and the motor carrying traction wheel, adapted, when the lever is swung in one direction, to lift the wheel from the ground, together with a tubular housing for said flexible connection adapted to serve as a guide therefor.

11. The combination with a vehicle having a main frame, a rear axle and a pair of supporting wheels thereon, of a motor carrying traction wheel, a motor supporting frame carried thereby and flexibly connected with the rear axle between said rear wheels; said motor and traction wheel being adapted to drive the vehicle through the medium of said connection, a lever pivoted to the main frame and a flexible connection between the lever and the motor carrying traction wheel adapted, when the lever is swung in one direction, to lift the wheel from the ground, together with a tubular housing for said flexible connection adapted to serve as a guide therefor and provided with an anti-friction pulley over which said flexible connection runs.

12. The combination with a vehicle having a main frame, a rear axle and a pair of supporting wheels thereon, of a motor carrying traction wheel, a motor supporting frame carried thereby and flexibly connected with the rear axle between said rear wheels; said motor and traction wheel being adapted to drive the vehicle through the medium of said connection, a lever pivoted to the main frame, a flexible connection between the lever and the motor carrying traction wheel adapted, when the lever is swung in one direction, to lift the wheel from the ground, and means for locking said lever in a position to support the motor wheel above the ground.

In testimony whereof I affix my signature in the presence of two witnesses.

HERMAN J. STARR.

Witnesses:
  H. L. STOUGHTON,
  FERNE A. BARTLETT.